United States Patent [19]
Williamson et al.

[11] Patent Number: 6,016,086
[45] Date of Patent: Jan. 18, 2000

[54] NOISE CANCELLATION MODIFICATION TO NON-CONTACT BUS

[75] Inventors: John M. Williamson, Stittsville; Alexandre J. Guterman, Nepean; Robert Zani, Stittsville; Terry Newell; Anthony K. Dale Brown, both of Kanata, all of Canada

[73] Assignee: Nortel Networks Corporation, Montreal, Canada

[21] Appl. No.: 09/054,388

[22] Filed: Apr. 3, 1998

[51] Int. Cl.$^7$ ...................................................... H01P 5/18
[52] U.S. Cl. ............................ 333/109; 330/258; 333/12; 333/24 R
[58] Field of Search .................................... 333/12, 24 R, 333/109, 116; 326/30; 330/258

[56] References Cited

U.S. PATENT DOCUMENTS

| | | | |
|---|---|---|---|
| 3,500,259 | 3/1970 | Seidel | 333/109 X |
| 3,619,504 | 11/1971 | De Veer | 178/58 |
| 4,374,363 | 2/1983 | Previti | 330/263 |
| 4,570,034 | 2/1986 | Serrano | 179/84 |
| 5,138,287 | 8/1992 | Domokos et al. | 333/12 |
| 5,365,205 | 11/1994 | Wong | 333/109 |
| 5,376,904 | 12/1994 | Wong | 333/1 |
| 5,434,694 | 7/1995 | Saito et al. | 359/186 |
| 5,574,273 | 11/1996 | Nakagawa et al. | 235/492 |
| 5,583,449 | 12/1996 | Buuck et al. | 326/30 |
| 5,646,962 | 7/1997 | Harrison | 375/308 |

OTHER PUBLICATIONS

Hideki Osaka, Masaya Umemura and Akira Yamagiwa, 1 GT/s Back Plane Bus (XTL: Crosstalk Transfer Logic) using Crosstalk Mechanism, Hot Interconnects Symposium V 1997, Stanford University, California, USA, Aug. 21–23, 1997.

*Primary Examiner*—Paul Gensler
*Attorney, Agent, or Firm*—T. Gary O'Neill; Gowling, Strathy & Henderson

[57] ABSTRACT

A bus for high signal quality interconnections, comprising means for producing at least one common mode reflection, often for differential transmission line interconnections. Also, a bus for high signal quality interconnections further comprising means for under-damping the signal and/or reducing the common mode noise. In both cases the means are at least one impedance termination. To produce common mode reflections, there are non-contact couplers terminated by short and open circuits, which cause the reflections from via connectors and other like impedance discontinuities to be re-reflected in common mode so that they are rejected by a differential receiver. To produce under-damping of the signal and/or a reduction of the common mode noise, capacitive terminations are used. The under-damping of the signal sharpens in the falling edge of the coupler pulses.

31 Claims, 3 Drawing Sheets

NOISE CANCELLATION MODIFICATION TO NON-CONTACT BUS

The present invention relates broadly to electrical signal interconnects, and more specifically to high signal quality interconnects.

BACKGROUND OF THE INVENTION

Modern large-scale electronics, such as telecommunication or main-frame computing systems, are usually comprised of processing, access and/or memory functions. These processing, access and/or memory functions are often physically isolated modules, located on shelves of a cabinet, rack or like storage means. The modules on each shelf are interconnected by way of transmission lines on a large printed circuit board (PCB) referred to as a backplane (BP) located at the rear of the cabinet. If there are many modules, and hence many shelves, the storage means can be large and therefore the backplane can be a meter or more in length.

The transmission line interconnect is often called a bus, the bus being one or more conductors carrying data or control signals. The bus can be a point-to-multipoint or a multipoint-to-point interconnect. Indeed, the bus is usually connected to one or more signal sources, often called drivers, and one or more receivers. All connections can occur at the same or at multiple points along the bus.

Furthermore, the interconnection may be a differential bus to connect many differential electronic components. Differential electronic components are quite popular, and they use differential signals for inputs, outputs, or both. A differential signal is composed of two constituent signals of opposite polarity. Hence, the two constituent signals of a differential signal vary in phase by 180 degrees. Thus, differential electronic components have two terminals for each differential input port or differential output port. Differential electronic components respond to a difference in signals at the terminals for each port. If the same signal is incident at both terminals of a port, then this situation is defined as common mode. In common mode the difference between the signals at the two terminals of the port is zero, hence the differential electronic component does not respond. This is common mode rejection for differential electronic components.

The need for greater interconnect signal throughput has resulted in the need for the backplane to carry interconnect lines running at data rates upwards of 1 Giga-bits-per-second (Gbps). However, at such data rates, the interconnect must be considered as a transmission line with the propagating signal possessing wave properties. The wave properties will affect the signal quality along the transmission line. Impedance discontinuities and transmission line structure, for example, can cause signal reflections and local energy storage, respectively, which degrade the signal quality.

To address reflections arising from impedance discontinuities along the interconnecting transmission line, the traditional approach is to eliminate the impedance discontinuities causing the reflections. The impedance discontinuities are eliminated by ensuring that all element interfaces in the system are matched. By matched, it is meant that for each interface in the system, the impedance on one side of a given interface is the complex conjugate of the impedance on the other side of the same interface.

Often, the characteristic impedance of the bus, denoted by $Z_0$, is defined as the impedance of the system. In such cases, to accomplish the matching, all of the elements connected to the bus are matched to the characteristic impedance of the bus to eliminate reflections. Furthermore, the end of the bus itself is terminated by its characteristic impedance to eliminate reflections from the end of the bus itself.

In light of the above issues, conventional hardwired interconnects are not feasible because they cannot be perfectly terminated in the line characteristic impedance, in order to damp reflections produced at the end of the interconnect.

In addition to the reflection issues, reliability requirements of a point-to-multipoint bus favour isolation between each receiver and the bus. If this is the case, a catastrophic failure at one receiver does not impact the entire bus. Accordingly, one possible backplane may carry many point-to-point interconnects to achieve the required isolation, thereby increasing the number of backplane signal layers. A better solution to alleviate the reliability and reflection problems simultaneously, is point-to-multipoint transmission line interconnects achieved using AC coupling, also referred to as non-contact coupling, as disclosed by De Veer et al. in U.S. Pat. No. 3,619,504. This type of interconnect disclosed by De Veer et al. is called a non-contact bus.

De Veer et al. disclose a high-speed data transmission network employing a point-to-multipoint transmission line interconnect. Directional coupling elements are spaced along the transmission line to separate the signals detected by each receiver using non-contact coupling. The directional coupling elements themselves are short sections of transmission line placed in very close parallel proximity to the main signal transmission line traversing the backplane.

Typically, when the data transmission network disclosed by De Veer et al. is employed, the coupler lines are fed through a backplane via connector to a receiver in one of the modules mentioned above. At data rates in excess of 1 Gbps, the connector and attendant mounting vias represent impedance mismatch and can lead to signal quality problems due to reflections at the receiver. In addition, the required connector pins are at a premium. These problems are especially prevalent in point-to-multipoint buses, since there will be many impedance mismatches along the bus.

Sometimes, as in a connector, the interfaces cannot be perfectly matched. Hence, to reduce the performance impact of these impedance mismatches, ideally both the receiver and coupler end of the bus is terminated in the coupler's characteristic impedance, and that impedance is substantially equal to the characteristic impedance of the bus. This characteristic impedance is often a pure resistance, hence the desired termination is a resistor with resistance substantially equal to the characteristic impedance. Thus, reflections due to impedance mismatches are absorbed by elements in the system and do not substantially degrade the signal quality.

Osaka et al. (H. Osaka, M. Umemura and A. Yamagiwa, "1 GT/s Back Plane Bus (XTL:Crosstalk Transfer Logic) using Crosstalk Mechanism", Hot Interconnects Symposium V 1997, Stanford University, CA, Aug. 21–23, 1997) have disclosed a non-contact bus with acceptable signal quality by terminating the couplers at both ends with resistors substantially equal to the characteristic impedance of the couplers.

Often, however, this type of coupler termination is undesirable since the resistors either have to be mounted directly on the backplane or in a separate module. Backplane mounted components are undesirable for space and reliability reasons, and module mounted components require the coupler transmission line to pass through a connector to find the termination. It is therefore desirable to terminate the couplers without using a resistor substantially equal to the characteristic impedance of the coupler, and still maintain acceptable signal quality at the receivers in a point-to-multipoint bus.

SUMMARY OF THE INVENTION

An object of the present invention is to provide high signal quality interconnections.

To accomplish this object, a bus is provided for high signal quality interconnections, comprising means for producing at least one common mode reflection. The common mode reflections are rejected by the differential receiver.

In a further embodiment of the present invention, there is provided means for under-damping the signal for high signal quality interconnections.

Moreover, in another embodiment of the present invention, there is provided means for reducing the common mode noise in order to obtain high signal quality interconnections.

In yet another embodiment of the present invention, there is provided a method of achieving high signal quality interconnections comprising at least one non-contact differential coupler and at least one impedance termination for producing at least one common mode reflection.

BRIEF DESCRIPTION OF THE DRAWINGS

These and other features of the invention will become more apparent from the following description in which reference is made to the appended drawings in which.

DETAILED DESCRIPTION OF PREFERRED EMBODIMENTS OF THE INVENTION

By way of overview, the preferred embodiment of the present invention comprises impedance terminations in a bus 10 in order to produce common mode reflections. The common mode reflections are reflections that are in phase. Often, the bus 10 is differential in type. The common mode reflections are produced using at least one impedance termination, which is often connected to the differential non-contact couplers 20. If two impedance terminations are used, and if the reflection coefficients at the two interfaces between the terminations and the differential non-contact coupler 20 are opposite in sign, then common mode reflections are produced. Therefore, since the difference between the common mode reflected signals at the port terminals of the differential receiver 14 is zero, the reflected signals are rejected. The differential receiver 14 detects only the desired signal, and not the reflections, and thus a high signal quality interconnection is achieved.

Figure 1:
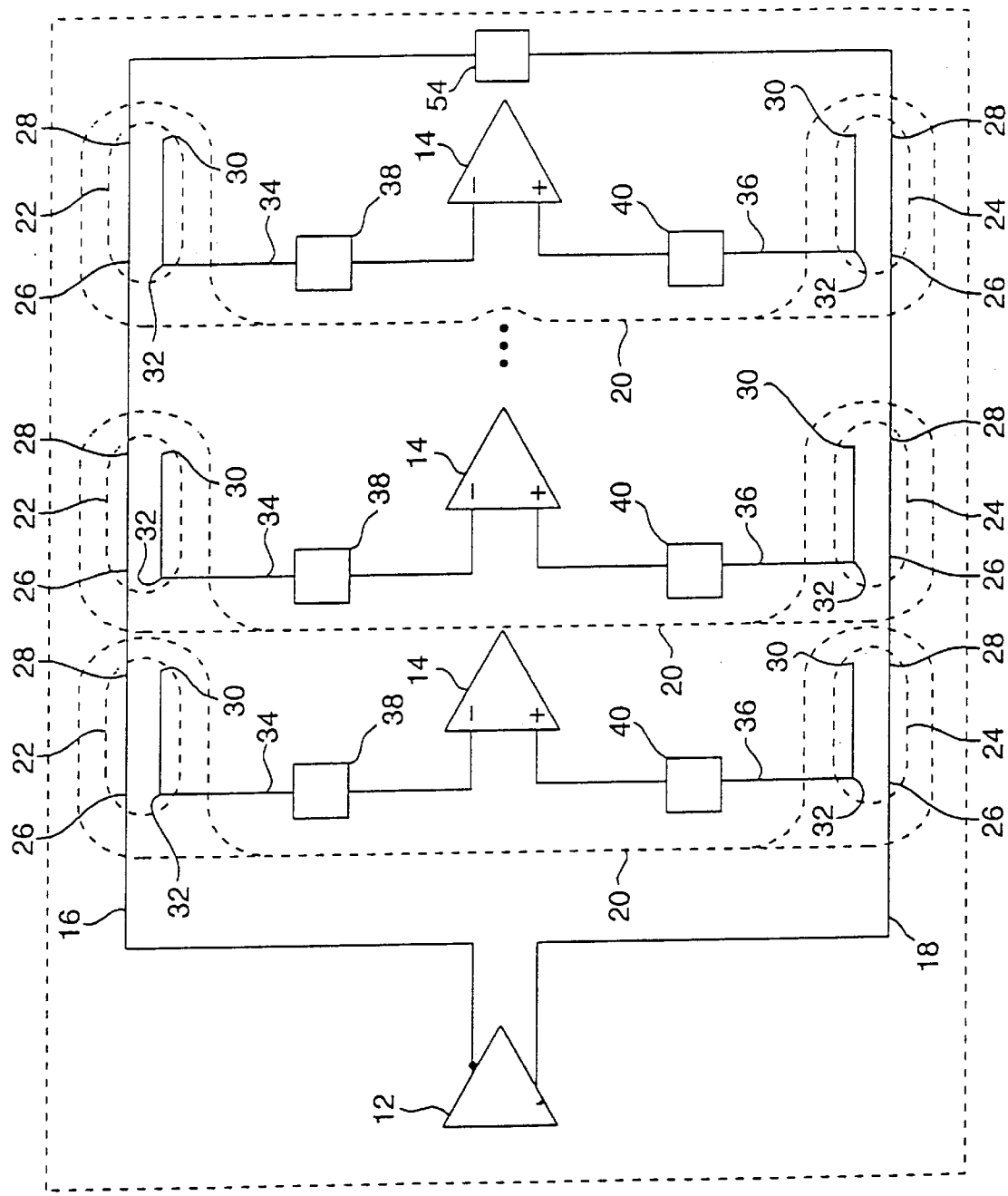
FIG. 1 schematically illustrates a differential non-contact bus in which reflections degrade the signal quality.

Specifically, FIG. 1 shows a typical point-to-multipoint interconnect bus 10. In some cases, the driver 12 and receivers 14 are responsive to differential signals, hence the bus 10 is therefore often a differential bus 10. The differential bus 10 consists of two constituent main transmission lines 16,18. There is one signal on each of the two transmission lines 16,18, and they are opposite in polarity, that is 180 degrees out of phase. Taken together, the two signals are called the differential signal.

The receivers 14 are physically isolated from, but electrically connected to, the driver 12 by the non-contact differential couplers 20. There is one differential non-contact coupler 20 for each differential receiver 14. Each non-contact differential coupler 20 consists of two constituent non-contact couplers 22,24, one for each transmission line 16,18 of the differential bus 10.

The differential bus 10 and differential non-contact couplers 20 are coplanar striplines in the preferred embodiment of the present invention. The constituent non-contact couplers 22,24 are sequential lengths of transmission line positioned in very close parallel proximity with the main transmission lines 16,18. In the preferred embodiment of the present invention, the parallel sections are 1.9 cm in length, however the length is not restricted to this. The constituent non-contact couplers 22,24 have four ports 26,28,30,32. The first 26 and second 28 ports define the portion of the main transmission line 16,18 with the greatest amount of electrical coupling with respect to the parallel section. The third 30 and fourth 32 ports define the parallel section. The coupling from the main transmission lines 16,18 into the differential non-contact couplers 20 will favour backward crosstalk rather than forward crosstalk because the third ports 30 are not terminated. Hence the output from the differential non-contact coupler propagates backward to the receiver 14. Thus, a signal incident on the first 26 port, will propagate to the second 28 and fourth 32 ports with the third port 30 being left floating.

A receiver 14 associated with a particular constituent non-contact coupler 22,24 is connected to the fourth ports 32 of the constituent non-contact couplers 22,24 by way of transmission lines 34,36 and connectors 38,40. The connectors 38,40 represent impedance discontinuities in the bus interconnect 10. Therefore, as the signals pass through the connectors 38,40, the signals are partly reflected back towards the constituent non-contact couplers 22,24. Since the constituent non-contact couplers 22,24 favour backward crosstalk, the reflections, which are incident on the fourth ports 32, will propagate to the third ports 30 and the first ports 26. The unterminated, that is open circuited, third ports 30 will re-reflect the signals back towards the receiver 14. These re-reflected signals propagate through the connectors 38,40 to the receiver 14. Since the same events occur at both constituent non-contact couplers 22,24, the differential receiver 14 detects the reflections as well as the desired signal and the detection of the reflections interfere with the desired signal quality.

Figure 2:
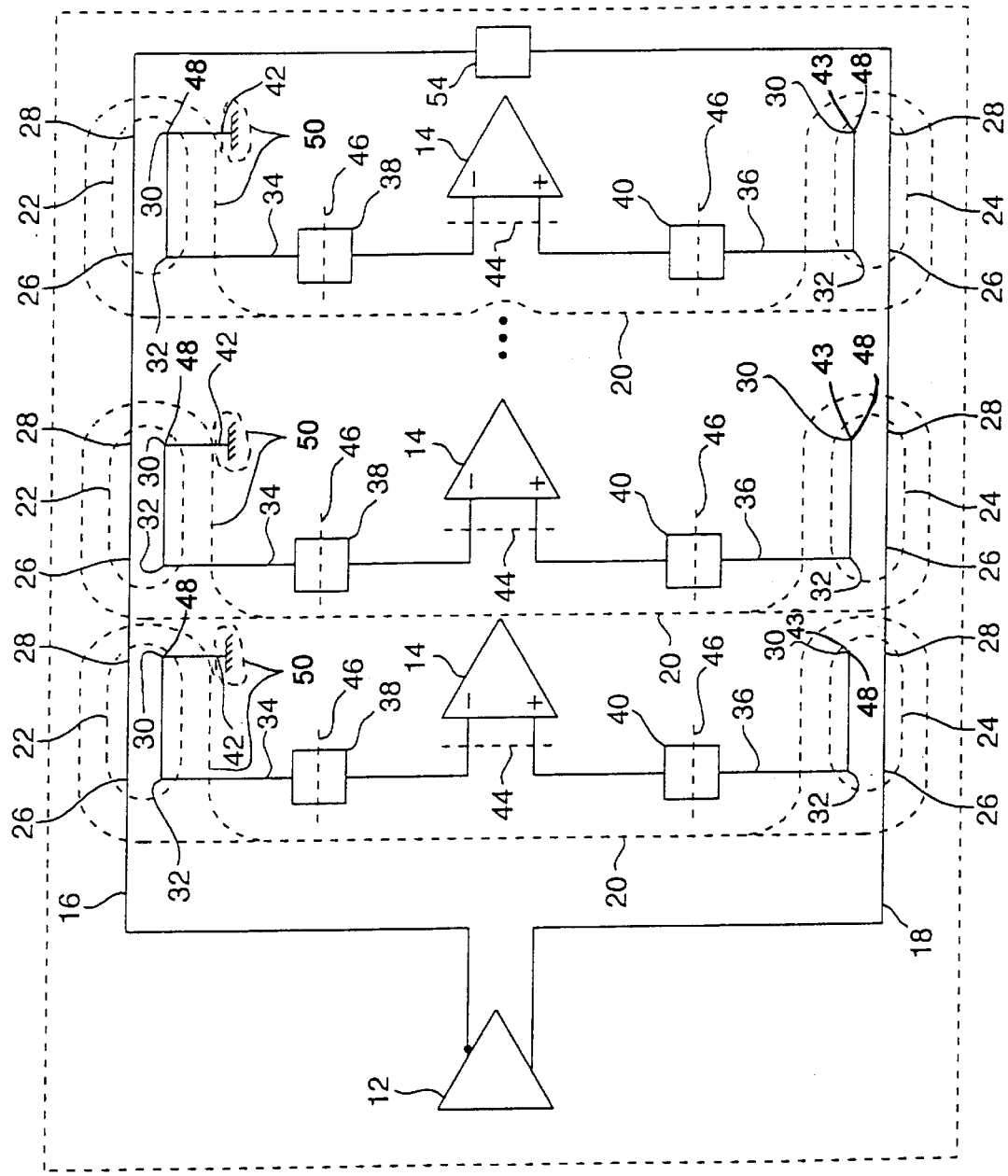
FIG. 2 schematically illustrates a preferred embodiment of the present invention, in which a differential non-contact bus is a high signal quality interconnect with means for producing common mode reflections.

The preferred embodiment in FIG. 2 avoids the signal quality problems described in the preceding paragraphs. One of the constituent non-contact couplers 22 has its third port 30 terminated by a short circuit 42. Consider if the same reflection as previously described occurs at the connector 38 impedance discontinuity. One of the constituent non-contact couplers 24 re-reflects the signal as before, due to its unterminated third port 30. However, the second constituent non-contact coupler 22 re-reflects and inverts the signal, due to the short circuit 42 terminated third port 30. The two signals in the constituent non-contact couplers 22,24 are originally 180 degrees out of phase because they are differential signals. After re-reflection at both third ports 30, and inversion at one third port 30 of the constituent non-contact coupler 22, the re-reflected signals are in phase. Therefore, upon arrival at the differential receiver 14, the reflections are in common mode, and hence rejected by the differential receiver 14. Thus, a high signal quality differential interconnect 10 is achieved.

Further, an imperfectly matched main transmission line 16,18 will also cause a reflection. This reflection induces a pulse travelling away from the receiver 14 in the coupler. After reflection off the third ports 30 the re-reflection is in common mode and is rejected by the differential receiver 14. Therefore high signal quality is again achieved.

Using mathematics, the preferred embodiment is further described as follows.

It is useful to define the concept of a reflection coefficient, $\Gamma$, defining the amount of signal transmitted and reflected at an interface of an impedance discontinuity. Specifically, $$\Gamma = \frac{Z_1 - Z_2}{Z_1 + Z_2} \quad (1)$$

where $Z_1$ and $Z_2$ are impedances of either side of the interface. In general, an interface with a reflection coefficient $\Gamma$, a reflected voltage waveform, $v_r$, is related to an incident waveform, $v_i$, according to $$v_r = \Gamma v_i \quad (2)$$

The differential bus 10 and the non-contact differential couplers 20 have substantially the same equivalent characteristic impedance, $Z_0$, and this is defined as the system characteristic impedance. The input impedance of the receivers 14 is designed to match the system characteristic impedance, $Z_0$, as much as possible so that the reflection coefficient at the line/receiver interface 44, denoted by $\Gamma_{REC}$, is $$\Gamma_{REC} = \frac{Z_i - Z_o}{Z_i + Z_o} \approx 0 \quad (3)$$

where the receiver 14 input impedance is $Z_i$.

There are connector vias 38,40 between each of the differential non-contact couplers 20 and each of the differential receiver 14 inputs. The connector vias 38,40 represent essentially equivalent impedances, denoted by $Z_V$, which may differ from $Z_0$, hence there is an impedance discontinuity. The impedance discontinuity causes reflections to occur at the interface. Thus, the reflection coefficient at the differential non-contact coupler/via connector interface 46, denoted by $\Gamma_N$, is $$\Gamma_N = \frac{Z_v - Z_o}{Z_v + Z_o} \neq 0 \quad (4)$$

In the differential bus 10 shown in FIG. 1, the third port 30 of the differential non-contact coupler 20 re-reflects the signal that was first reflected due to the impedance discontinuity at interface 46 described by $\Gamma_N$.

The reflected waveform, $v_r^{(1)}$, from the via connector 38,40 discontinuity reaching the third port 30 of the non-contact differential coupler 20 is $$v_r^{(1)} = \Gamma_N v_i \quad (5)$$

After reflecting at the third port of the non-contact differential coupler the re-reflected waveform, $v_r^{(2)}$, returns to the receiver 14 and is given by $$v_r^{(2)} = \Gamma_F \Gamma_N v_i \quad (6)$$

where $\Gamma_F$ is the reflection coefficient of the interface 48 which is defined by the third port 30 of the non-contact differential coupler 20 and the termination that is connected to the third port 30, if any. If the third port 30 of the non-contact differential coupler 20 is not terminated, then an interface 48 still exists with a reflection coefficient $\Gamma_F$. For sufficiently large values of $\Gamma_N$, the reflections cannot be ignored and will interfere with received signal, $v_{REC}$. The received signal, $v_{rec}$, after encountering two via connector interfaces 46 and after one non-contact differential coupler third port interface 48 reflection, is given by $$v_{REC} = v_i(1+\Gamma_N)(1+\Gamma_N\Gamma_F) \quad (7)$$

The first factor in Equation (7) is the incident signal, the second is the transmission through the via connectors 38,40 and the third term is the degradation in signal quality due to the reflections.

The situation is further complicated by the fact that the signals are differentially driven by the source 12. This means that the driver 12 launches a positive signal, $v_i$, and a negative signal, $-v_i$. Equation (7) must be explicitly rewritten to highlight differential mode operation as $$v_{REC}^d = v_i^p(1+\Gamma_N^p)(1+\Gamma_N^p\Gamma_F^p) - v_i^n(1+\Gamma_N^n)(1+\Gamma_N^n\Gamma_F^n) \quad (8)$$

where d denotes differential mode, p refers to the positive signal component and n refers to the negative signal component. In FIG. 1, the differential non-contact coupler 20 is unterminated; that is the third port 30 is open circuited. Also, by definition $v_i^p = v_i$, $v_i^n = -v_i$ for differential signals, $\Gamma_N^p = \Gamma_N^n = \Gamma_N$, assuming similar via connectors 38,40, and $\Gamma_F^p = \Gamma_F^n = 1$ for open circuited non-contact differential coupler third ports 30. Therefore Equation (8) reduces to $$V_{REC}^d = 2v_i(1+\Gamma_N)^2 \quad (9)$$

Hence, according to Equation (9), for the differential bus 10 in FIG. 1 where the third port 30 of the non-contact differential coupler 20 is unterminated, the reflections degrade the signal quality by a factor of $(1+\Gamma_N)$. Note that the other $(1+\Gamma_N)$ is due to the transmission through the via connectors 38,40.

The preferred embodiment of the present invention includes a viaed short/open coupler (VSOC), which is the combination of a differential coupler 20 and a short circuit termination 42, as schematically illustrated in FIG. 2. In this case, $\Gamma_N$, is the same as in Equation (4), however; $\Gamma_F$ is different for the positive and negative constitutent non-contact couplers 22,24. Since the positive side is open circuited 43 and the negative side shorted circuited 42 to the ground, $$\Gamma_F^p = 1 \quad (10)$$

$$\Gamma_F^n = -1 \quad (11)$$

After the first re-reflection from the third port 30 of the non-contact differential coupler 20, the reflected signal returning to the receiver 14 on the positive side 36 of the coupler 24 is described by Equation (6); that is, $v_r^{(2)} = \Gamma_N V_i$, since $\Gamma^p_F = 1$. Similarly, the re-reflected signal returning to the receiver on the negative side 34 would be given by $v^{(2)}_r = -\Gamma_N V_i$, since $\Gamma^n_F = -1$. Thus, the voltage at the receiver 14, previously given by Equation (8), now reduces to $$v_{REC}^d = 2v_i(1+\Gamma_N) \quad (12)$$

Equation (12) indicates that the reflections have been converted to common mode and are thus not detected at the differential receiver. Only the transmission factor (1+Γ_N) remains, and there is no term for degradation in signal quality due to the reflections.

Also, it is worth considering when there is no reflections because the third ports 30 are properly matched, that is if the third ports 30 of both the constituent non-contact couples 22,24 are terminated in the characteristic impedance of the couplers 22,24. In this case, Γ_F=0 in both Equations (7) and (8), and it follows that Equation (8) reduces to Equation (12). Thus, the viaed short/open coupler 50 has cancelled the reflection.

Another embodiment of the present invention uses open side capacitive compensation. In this embodiment, the bus 10 comprises means for under-damping the signal and/or reducing the common mode noise. The means is an impedance termination, which is often a capacitor, which is in turn often connected to the non-contact differential couplers 20.

Figure 3:
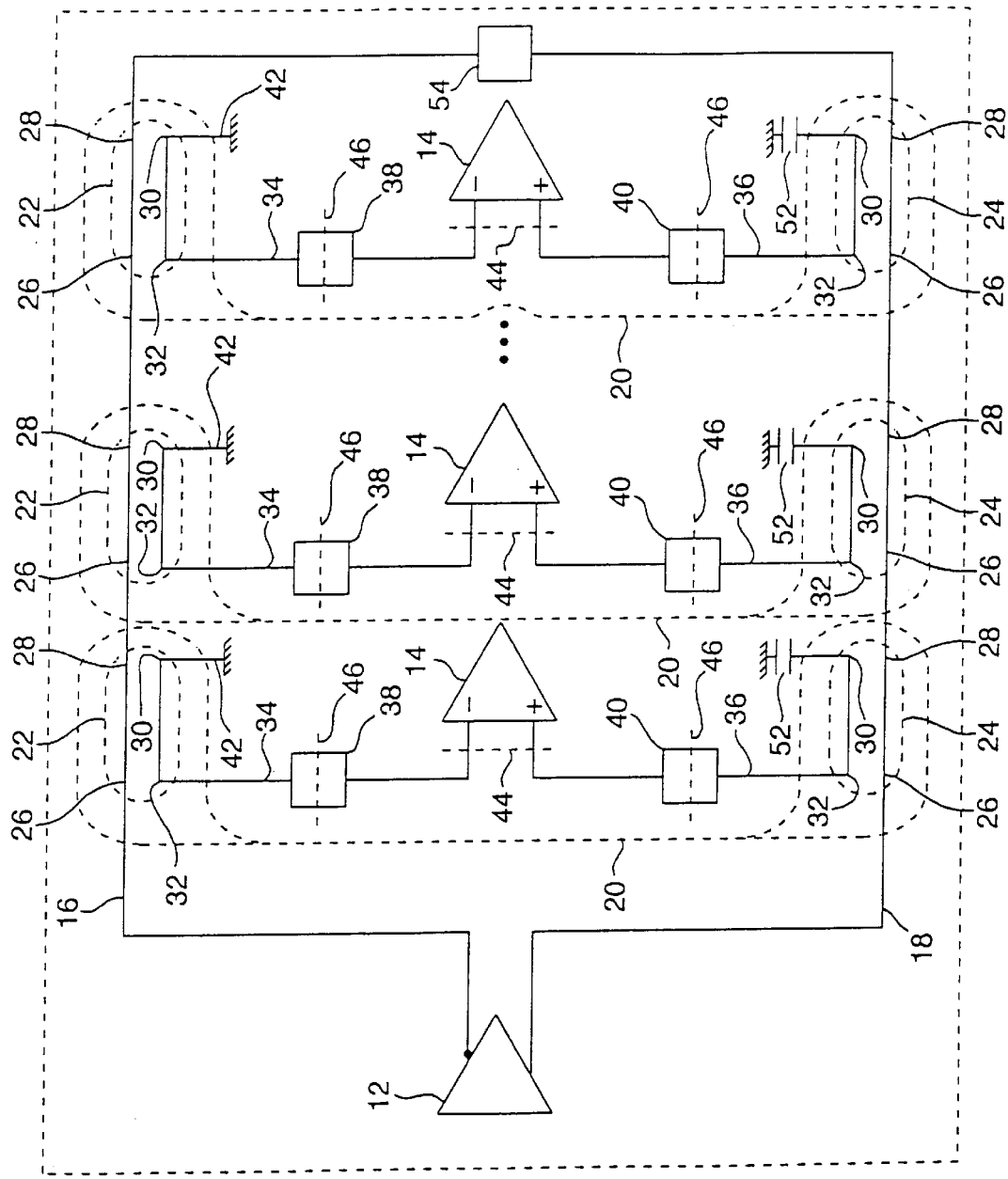
FIG. 3 schematically illustrates a further embodiment of the present invention in which a differential non-contact bus is a high signal quality interconnect with means for under-damping the signal and means for reducing the common mode noise.

FIG. 3 is essentially similar to FIG. 2 except that capacitors 52 to ground have been added to the open circuited constituent non-contact couplers 24. The non-contact differential coupler 20 nearest the driver 12 end of the bus 10 receives 0.6 pF while the next coupler 20 has a capacitance which is slightly higher, and so on, up to about 1.5 pF. This capacitance range is not unique, other ranges of increasing capacitances can be used. The presence of the capacitors 52 has two beneficial effects: better common mode noise rejection and slight signal under-damping causing a sharper falling edge on the signal waveform. These capacitors 52 to ground can be formed by extending a transmission line from a non-contact differential coupler 20 around a ground via, thus avoiding adding components to the backplane.

First, at high frequencies above 50 GHz, 0.6 pF has an impedance less than 5 Ω which is practically a short circuit. At frequencies in this range and higher, the open/short coupler 50 rejects common mode noise signals. Moreover there is significant partial common mode rejection at frequencies down to approximately 2.5 GHz.

Second, whenever capacitance, C, and inductance, L, exist together in a circuit there is a frequency, f, $$f = \frac{1}{2\pi\sqrt{LC}} \quad (13)$$

at which resonance occurs. The larger and L and/or C the lower the resonant frequency will be. In the present embodiment the addition of the capacitances 52 causes a slight downward shift in the resonant frequency. Of the energy present in the non-contact differential coupler 20 a significant amount is at this resonant frequency leading to the observed faster transition on the falling edge of the pulse. The slight increase in the capacitance 52 for non-contact differential couplers 20 further and further down line 16,18 is required since there is progressively less high frequency energy available for coupling in the down line non-contact differential couplers 20.

From a transmission line perspective, a capacitive termination 52 causes a negative reflection which will subtract from any existing signal. In this case the negative reflection from the capacitors 52 subtracts from the existing trailing edge of the waveform, resulting in an apparent quicker falling edge.

Thus, the embodiments of the present invention possess the ability to significantly improve signal quality relative to unterminated non-contact differential couplers 20. So effective is the reflection cancellation that a main line termination 54 is not necessary, and its absence will not seriously impact the quality of the received signals. Furthermore, the principles can be applied to a bus 10 with any number of drivers 12, however the signal quality is higher with a lower number of drivers 12.

Numerous modifications, variations and adaptations may be made to the particular embodiments of the invention described above without departing from the scope of the invention, which is defined in the claims.

We claim:

1. A differential bus for high signal quality interconnections, having a differential signal applied at at least one non-contact differential coupler having a first and a second constituent non-contact coupler, comprising:
   a. at least one impedance termination connected to a port of the non-contact differential coupler for producing at least one common mode reflection at a port of the non-contact differential coupler.

2. A bus as recited in claim 1, further comprising:
   a. at least one impedance termination connected to a port of the non-contract differential coupler for under-damping the signal.

3. A bus as recited in claim 1, further comprising:
   a. at least one impedance termination connected to a port of the non-contact differential coupler for reducing common mode noise.

4. A bus as recited in claim 1, further comprising:
   a. at least one impedance termination connected to a port of the non-contact differential coupler for under-damping the signal and reducing common mode noise.

5. A differential bus for high signal quality interconnections, having a differential signal applied at at least one non-contact differential coupler, the non-contact differential coupler having a first and a second constituent non-contact coupler, comprising:
   a. a short circuit impedance termination, being connected to an uncoupled port of the first constituent non-contact coupler of each non-contact differential coupler;
   b. an uncoupled port of the second constituent non-contact coupler of each differential non-contact coupler being unterminated.

6. A bus as recited in claim 5, further comprising:
   a. a capacitor having a first value for under-damping the signal connected in series between the uncoupled port of the second constituent non-contact coupler of each non-contact differential coupler and ground.

7. A bus as recited in claim 5, further comprising:
   a. a capacitor having a first value for reducing common mode noise connected in series between the uncoupled port of the second constituent non-contact coupler of each non-contact differential coupler and ground.

8. A bus as recited in claim 5, further comprising:
   a. a capacitor having a first value for under-damping the signal and reducing common mode noise connected in series between the uncoupled port of the second constituent non-contact coupler of each non-contact differential coupler and ground.

9. A bus as recited in claim 6 wherein:
   a. the capacitor being an extension of the uncoupled port of the second constituent coupler around a ground via.

10. A bus as recited in claim 7 wherein:
    a. the capacitor being an extension of the uncoupled port of the second constituent coupler around a ground via.

11. A bus as recited in claim 8 wherein:
    a. the capacitor being an extension of the uncoupled port of the second constituent coupler around a ground via.

12. A differential bus for high signal quality interconnections, having a differential source providing a differential signal, at least one differential receiver, at least one non-contact differential coupler for the differential receiver, the non-contact differential coupler having a first and a second constituent non-contact coupler, comprising:

a. a short circuit impedance termination, being connected to an uncoupled port of the first constituent non-contact coupler of each non-contact differential coupler;

an uncoupled port of the second constituent non-contact coupler of each differential non-contact coupler being unterminated;

c. a capacitor, being connected in series between the second constituent non-contact coupler of each non-contact differential coupler pair and ground, for under damping the signal and reducing common mode noise;

d. wherein the capacitor is an extension of the second constituent coupler around a ground via;

e. wherein the capacitor increases in capacitance as the distance from the differential source increases.

13. A bus as recited in claim 12, wherein:

a. the variation in capacitance being from substantially equal to 0.6 pF for the capacitor nearest to the differential source to substantially equal to 1.5 pF for the capacitor furthest from the differential source.

14. A bus as recited in claim 12, wherein:

a. the capacitors reduce common mode noise for frequencies above 2.5 GHz.

15. A bus as recited in claim 12, wherein:

a. each constituent non-contact coupler includes a 1.9 cm long transmission line section being in close parallel proximity to a main transmission line.

16. A bus as recited in claim 12, wherein:

a. the differential bus is unterminated.

17. A method for achieving high signal quality interconnection using a differential bus, the bus having a differential source and at least one differential receiver, the steps comprising:

launching a signal on the bus using the source, reflecting a portion of the signal using at least one impedance discontinuity along the bus, the portion being defined by the impedance discontinuity, altering the reflected portion of the signal, to produce a least one common mode reflection, and rejecting the common mode reflection at the receiver.

18. A method as recited in claim 17, further comprising the step of:

under-damping the signal by altering the reflected portion of the signal.

19. A method as recited in claim 17, her comprising the step of:

reducing common mode noise by altering the reflected portion of the signal.

20. A method as recited in claim 21, further comprising the step of:

under-damping the signal and reducing common mode noise by altering the reflected portion of the signal.

21. A method for achieving high signal quality interconnection using a differential bus, the bus having a differential source, at least one differential receiver and at least one non-contact differential coupler, the steps comprising:

launching a signal on the bus using the source, reflecting a portion of the signal using at least one impedance discontinuity along the bus, the portion being defined by the impedance discontinuity, altering the reflected portion of the signal using at least one impedance termination, to produce a least one common mode reflection, and rejecting the common mode reflection at the receiver.

22. A method as recited in claim 21, further comprising the step of:

under-damping the signal by altering the reflected portion of the signal using at least one impedance termination.

23. A method as recited in claim 21, further comprising the step of:

reducing common mode noise by altering the reflected portion of the signal using at least one impedance termination.

24. A method as recited in claim 21, further comprising the step of:

under-damping the signal and reducing common mode noise by altering the reflected portion of the signal using at least one impedance termination.

25. A method as recited in claim 21, wherein:

the impedance termination is connected to the non-contact differential coupler.

26. A method for achieving high signal quality interconnection using a differential bus, the bus having a differential source, at least one differential receiver and at least one non-contact differential coupler, each non-contact differential coupler having a first constituent non-contact coupler and a second constituent non-contact coupler, the steps comprising:

launching a signal on the bus using the source, reflecting a portion of the signal using at least one impedance discontinuity along the bus, the portion being defined by the impedance discontinuity, inverting the reflected portion of the signal on the first non-contact constituent coupler with respect to the reflected portion of the signal on the second non-contact constituent coupler, to produce a least one common mode reflection, and rejecting the common mode reflection at the receiver.

27. A method as recited in claim 26 wherein:

the inverting is accomplished by using a short circuit impedance termination connected to the first constituent non-contact coupler and having the second constituent non-contact coupler unterminated.

28. A method as recited in claim 26 further comprising the step of:

under-damping the signal by using a capacitive impedance termination connected to the second constituent non-contact coupler.

29. A method as recited in claim 26 further comprising the step of:

reducing common mode noise by using a capacitive impedance termination connected to the second constituent non-contact coupler.

30. A method as recited in claim 26 further comprising the step of:

under-damping the signal and reducing common mode noise by using a capacitive impedance termination connected to the second constituent non-contact coupler.

31. A method for achieving high signal quality interconnection using a bus, the bus having a differential source, at least one differential receiver and at least one non-contact differential coupler, each non-contact differential coupler having a first constituent non-contact coupler and a second constituent non-contact coupler, the steps comprising:

launching a signal on the bus using the source, reflecting a portion of the signal using at least one impedance discontinuity along the bus, the portion being defined by the impedance discontinuity, inverting the reflected portion of the signal on the first non-contact constituent coupler with respect to the reflected portion of the signal on the second non-contact constituent coupler to produce a least one common mode reflection, the inverting being accomplished by using a short circuit impedance termination connected to the first constituent non-contact coupler and having the second constituent non-contact coupler unterminated, rejecting the common mode reflection at the receiver, using a capacitive impedance termination connected to the second constituent non-contact coupler, to underdamp the signal to reduce common mode noise.

* * * * *